United States Patent Office 3,520,242
Patented July 14, 1970

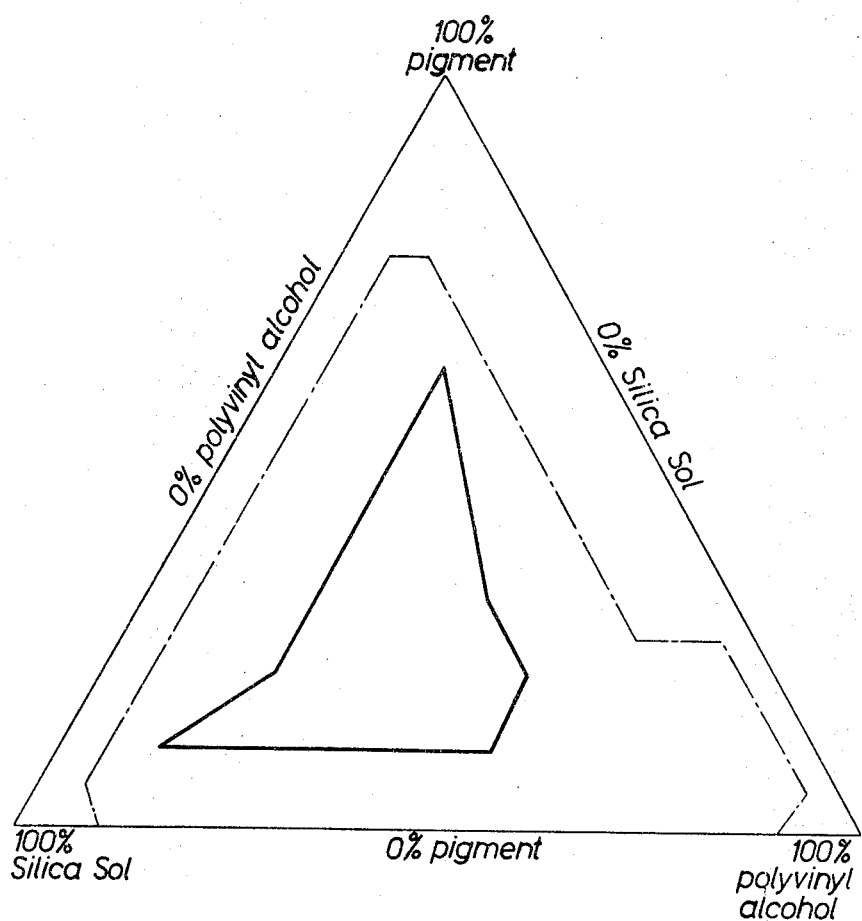
Inventors
George Kemp,
Michael Robin Widdicks &
Charles Neil Henderson

3,520,242
COATED PAPER PRODUCTS
George Kemp, Beaconsfield, and Michael Robin Widdicks and Charles Neil Henderson, High Wycombe, England, assignors to Wiggins Teape Research & Development Limited, London, England, a British company
Filed Sept. 23, 1965, Ser. No. 489,651
Claims priority, application Great Britain, Nov. 18, 1964, 47,043/64
Int. Cl. G03c 1/54, 1/86
U.S. Cl. 96—75
12 Claims

ABSTRACT OF THE DISCLOSURE

A subbing layer to render a polyolefin-coated substrate adherent to, for example, photographic emulsion, printing inks and adhesives, which layer comprises an aqueous silica sol, a non-polymeric acid and a polymeric film-forming material including polyvinyl alcohol or carboxymethyl cellulose. The subbing layer is applied to the polyolefin as an aqueous composition, and is then dried and cured.

---

This invention relates to polyolefin coated products and in particular to polyolefin-coated products having an absorptive coating applied thereto.

Polyolefins are unreceptive to aqueous coatings unless specially treated. Thus, for example, the complete specification of patent application No. 10,915/62 describes a composite paper product comprising a sheet of paper having on at least one surface thereof an extruded polyolefin film whose exposed surface has been treated by electrical discharge to render the surface adherent to photographic coatings.

Not only are untreated polyolefin surfaces unreceptive to aqueous coatings; they are also non-absorptive. Thus, printing and writing inks which rely on absorption in the substrate to which they are applied are not readily applied to polyolefin surfaces. Similarly when diazo solutions are applied to untreated polyolefin surfaces the maximum density which can be achieved is rather low. An additional drawback is that untreated polyolefin surfaces do not readily accept pencil markings.

In order for a polyolefin coated product such as a polyolefin coated paper to be suitable as a base for example for printing inks, writing inks and diazonium salt solutions it must readily accept and absorb these substances. It has been proposed to use an absorptive coating layer on the polyolefin for this purpose. However, such a layer must adhere well to the polyolefin and must have satisfactory scratch resistance when dry. In addition it should have good adhesion when rewetted and should be resistant to wet rubbing. The absorptive layer should preferably also accept pencil marking.

It is of further importance that an economic product should be produced.

It has been proposed to use silica sols as coatings for hydrophobic surfaces to increase absorption. It has also been proposed to use polymeric organic films applied from aqueous suspension. However, even when used in combination silica sols and polymeric organic films do not yield sufficiently good absorption and at the same time good adhesion, particularly wet adhesion, to render the products entirely satisfactory.

It has now been discovered, however, that by using a coating comprising a silica sol and an organic film-forming polymer and in addition an acid, absorptive coating layers with improved adhesion in combination with absorption are obtained.

According to a first aspect of the present invention there is provided a method of treating a product having an extruded polyolefin coating applied thereto which method comprises applying to the polyolefin surface of the coating an acidic aqueous composition comprising an aqueous silica sol, an acid-stable, organic polymeric film-forming material and an acid, and thereafter drying the product, whereby the dried composition on the polyolefin surface possesses absorptive properties.

The invention further includes products when made by this method and provides an absorptive polyolefin-coated paper product comprising a polyolefin-coated paper carrying bonded to the surface of the polyolefin a composition comprising an acid-stable organic polymeric bonding material, silica particles and an acid, said composition being such as to confer absorptive properties on the polyolefin surface of the paper.

By the term "absorptive properties" in accordance with this invention is meant the ability of the polyolefin surface to accept for example printing and writing inks and diazo salt solutions and to key dyes, pigments and coatings applied from oleaginous, aqueous and organic solvent solutions and suspensions.

In carrying out the method of the present invention the aqueous coating composition must be dried on the substrate at an elevated temperature, or if originally dried at ambient temperature, the coating should be heated for a short time, for example in an oven at a temperature of about 70° C. for a few minutes. Unless such heating is carried out the product tends to exhibit chalking and does not have good wet-rub resistance; the coating may be removed for example by applying a pressure-sensitive tape and then sharply pulling the tape away. The elevated temperature is believed to produce a curing effect on the coating. However coatings produced in accordance with this invention and dried on production coating machines at elevated temperatures consistent with acceptable production rates have good adhesion properties and do not require any separate heat "curing" step.

It has been found by experiments in which the acid addition was varied that the pH of the aqueous composition should preferably be between about 2 and about 7 for there to be good adhesion between the coating and the polyolefin surface. The upper limit of pH depends to some extent on the film-forming material used. More preferably the pH should be between about 2 and about 5 since gelling of the compositions tends to take place between pH 5 and pH 7. It is particularly preferred to use a pH towards the lower end of the range 2 to 5 and preferably between pH 2 and pH 3 or between pH 2 and pH 2.5.

Examples of acids which may be used to produce the pH values in the above ranges are nitric acid, hydrochloric acid, acetic acid and citric acid. Other acids may however be used. The term "acid" does not include such acidic groups as may occur in the molecules of the organic polymeric film-forming material.

The substrate for the polyolefin coating may not necessarily be paper. For example the substrate may be cardboard or a linen type of material. However it has been found that the method of the invention in general does not work so well with unsupported polyolefin film, the adhesion produced between the polyolefin surface and the applied absorptive coating tending to be poorer. This may be due to the fact that unsupported polyolefin film is in general extruded at a lower temperature and hence there may be a lower degree of oxidation of the polyolefin surface. The degree of oxidation of the polyolefin surface is believed to be one of the important factors involved in rendering the absorptive coating adherent to the polyolefin surface.

The organic film-forming polymeric material must be acid-stable and must be of such a type and must be present in such concentration that its produces a composition having satisfactory coating properties, for example, a suitable viscosity. A preferred film-forming polymer is polyvinyl alcohol. Examples of suitable polyvinyl alcohols which are available commercially are "Gohsenol" and "Gelvatol" (trademarks). Gohsenol denotes a water-soluble polyvinyl alcohol resin, and Gelvatol, a water-soluble polyvinyl alcohol resin ranging from partial to complete hydrolization. However other film-forming materials may be used, if necessary in conjunciton with a suitable wetting agent. For example carboxymethyl cellulose may be used as the film-forming material when used in conjunction with a suitable wetting agent.

Suitable silica sol suspensions which are available commercially are "Syton 2X," "Ludox HS" and "Pyramol A30" (trademarks) denoting colloidal aqueous preparations of silica having a particle size of $10^{-5}$ to $10^{-7}$ cm. and being stable against gelation and aggregation.

When polyvinyl alcohol is used as the polymeric film-forming material the ratio by weight of dry polyvinyl alcohol to dry silica sol may be between 95:5 and 5:95 whilst maintaining good adhesion to the polyolefin surface. However the best absorption and writing properties are obtained when the proportion of the silica sol is high.

The particular proportions of the silica sol, acid and polymeric film-forming material which are used will depend for example on the particular components which are chosen for the composition and the use to which it is desired to put the product. In a particular case the best proportions can readily be determined by the skilled man. As an example however a formulation for coatings required to absorb diazo solutions, printing inks and writing inks is as follows:

|  | Ml. |
|---|---|
| 2.5% solution of polyvinyl alcohol in water | 100 |
| 30% silica sol suspension | 40 |
| 5 N nitric acid | 2 |

A coating made from such a formulation will adhere well not only to spark discharge treated polyolefin surfaces but also to polyolefin surfaces which have not been electrically treated.

The solvent used in the coating composition is preferably water. However up to at least 75% of the water in the composition may be replaced by another miscible solvent, particularly an alcohol such as ethyl alcohol or methyl alcohol. This replacement can sometimes be useful in increasing the drying rate of the composition and improving the spreading properties of the composition.

The coating weight may be as little as one or two grams per square metre up to 15 grams per square metre or more, depending on the use to which it is intended to put the product. Thus, higher coating weights are generally desirable in diazo printing applications and where mechanical erasure is likely to occur, for example where ink marks are required to be erased. In the latter case sufficient of the coating layer must remain to permit the writing in of corrections.

By the method of the present invention absorptive coatings can be produced which have a high level of transmision to both visible and ultra-violet light. Thus by using a translucent support, for example a polyolefin-coated tracing paper, the products made in accordance with the method of the present invention may be employed as photographic intermediates.

A coating made from a formulation such as is exemplified above dries to give a glossy surface. However, such a coating may readily be adapted so that a matt surface is obtained. This may be achieved, for example, by adding to the composition certain wetting agents or, more preferably, a divalent metal salt solution such as calcium chloride solution to precipitate the silica sol. Thus to achieve a matt finish when the silica sol is in the form of a 30% disperson in water about 2.4 ml. of the wetting agent "Ampholyte WS" (trademark) denoting ammonium N-lauryl-tetraethoxyamino sulfonate or about 30 ml. of calcium chloride solution of concentration 5 gm. ions Ca/litre may be added to the coating composition the ratio of volumes of sol dispersion to calcium chloride solution being preferably 4:3. Using these proportions substantially all of the silica sol is precipitated. The additions of the precipitating agent must be made carefully to ensure that a uniform suspension is achieved, and especially on account of the increase in viscosity which is caused.

The matt finish also confers a paper-like feel to the polyolefin surface, which may be an additional advantage in some applications, for example when the product is to be used as a photographic base paper.

The fact that glossy or matt coatings can be produced is also useful for the reason that the finish on the polyolefin film is determined by the type of chill roll employed in the extrusion process. There is therefore no need to use a particular type of chill roll to determine the finish in the final product.

In order to accept pencil markings the coatings must have sufficient abrasive properties. The specific formulation described above produces a coating which is sufficiently abrasive to allow softer pencils to mark sufficiently. However, when harder pencils are to be used for example when the product is to be used as a drafting material it is desirable to improve the abrasive properties of the coatings. This may be done by addition of pigments to the formulations, for example, precipitated or micronised silicas or titanium oxide, or particulate organic materials such as unburst starch. Thus in the above specific formulation about 3 gms. of a silica pigment suspended in 10 ml. water may be used, or alternatively, about 15 grams of unburst starch. Such additions result in further improved absorption.

In order to show the effect of pH on the adhesion to a polyethylene-coated paper of a silica sol-polyvinyl alcohol composition to which additions have been made compositions were formulated as follows:

|  | Ml. |
|---|---|
| 2.5% solution of polyvinyl alcohol in water | 100 |
| 30% silica sol suspension | 40 |
| 5 N nitric acid | $x$ |
| Aqueous solution of 3 gms. "Gasil 200" (silica pigment) | 10 |
| Aqueous solution of calcium chloride containing 5 gms. ions/litre of calcium | 30 |

The adhesiveness of the composition to the polyethylene coated paper, as determined by wet rubbing, for different pH values and for two different types of polyvinyl alcohol is shown below:

99% HYDROLYSED POLYVINYL ALCOHOL

| 5 N nitric acid x mls. | pH | Adhesion on wet rubbing |
|---|---|---|
| 0 | 10 | Poor. |
| 0.4 | 7.6 | Do. |
| 0.6 | 6.9 | Quite good. |
| 1.2 | 4.9 | Good. |
| 1.4 | 2.5 | Very good. |

78% HYDROLYSED POLYVINYL ALCOHOL

| 5 N nitric acid x mls. | pH | Adhesion on wet rubbing |
|---|---|---|
| 0.6 | 7.1 | Poor. |
| 0.8 | 6.7 | Quite good. |
| 1.2 | 4.0 | Good. |
| 1.4 | 2.4 | Very good. |

When pigments are added to the composition they are preferably first suspended in water before addition to the composition. The proportion of pigment added may be varied according to the result required. The ratios of dry polyvinyl alcohol:dry sol:dry pigment can be varied within quite broad limits. Referring to the accompanying triangular graph, excellent results are achieved in the central area indicated on the graph, that is within the area bounded approximately by the following points on the graph:

| Percent PVA | Percent Sol | Percent Pigment |
|---|---|---|
| 20 | 20 | 60 |
| 20 | 70 | 10 |
| 60 | 30 | 10 |

Unsatisfactory results are obtained outside the area bounded by the discontinuous line, that is, outside the approximate triangle:

| Percent PVA | Percent Sol | Percent Pigment |
|---|---|---|
| 95 | 5 | 0 |
| 5 | 95 | 0 |
| 5 | 15 | 80 |

In between these boundaries acceptable results can be achieved and the skilled man can readily determine suitable ratios to achieve the results required. The pigment used in the above case was a silica Gasil 200 (Crosfield) but again the skilled man can readily determine the best proportions using other pigments. The areas will change depending, for example, on the adhesive demand of the pigment.

The above systems contained calcium chloride in the ratio referred to earlier.

In systems containing additional pigments the coating weight can again be from 1 to 15 g.s.m., or more.

Other additives may be employed to give specifically desired results, for example, hardening agents, dyes, coloured pigments, spreading agents, anti-static agents, anti-foaming agents and thin boiling starches.

When used as keying layers for photosensitive materials certain limitations must be placed on the formulation if satisfactory wet adhesion of silver light sensitive emulsions is to be obtained to permit the necessary chemical processing. To check that satisfactory wet adhesion is being obtained a test known in the photographic art is used. In this test a sample is coated with photographic emulsion, exposed to give maximum density and processed. While wet two scratches are made at right angles to cut through the emulsion to the support layer. The cross is then rubbed with the finger to assess the amount of emulsion which can be removed. An arbitrary scale can be made indicating by subjective assessment the amount of emulsion coat which can be removed. Thus, a figure of 1 represents virtually no removal whereas a figure of 9 denotes practically no adhesion.

Using this test it is shown that the ratio of silica sol to polyvinyl alcohol on a dry basis should preferably be equal to or greater than 24.1. If more polyvinyl alcohol is added, wet adhesion of the emulsion falls off. This limit is equivalent to a basic formulation of: 40 mls. silica sol (30% solids). 20 mls. polyvinyl alcohol (2½ solids).

The pH again requires adjustment by acid addition. Emulsion adhesion is dependent on pH but the pH range can also be extended if a wetting agent is employed in the keying coat. Such additions also improve adhesion level after incubation or ageing of the keying coat.

| pH | No wetting agent | | Wetting agent present | |
|---|---|---|---|---|
| | Unaged | Aged | Unaged | Aged |
| 9.1 | 9 | 9 | 1-3 | 1-3 |
| 7.0 | 7-9 | 9 | 1 | 1 |
| 5.1 | 1-2 | 1-2 | 1 | 1 |
| 4.0 | 1-2 | 1-2 | 1-2 | 1-2 |
| 2.7 | 2-6 | 9 | 1 | 2 |
| 2.0 | 9 | 9 | 1-2 | 1-2 |

(The figures above are wet adhesion values as determined by the above-described test.) These experiments were carried out using a keying coat of the above formula but varying the pH. A silver chloride emulsion was used in the tests and Triton 770 (anionic alkyl polyethylene oxide sulfate) was used as the wetting agent.

Satisfactory adhesion can also be obtained when ethyl alcohol is included in the composition.

For good wet adhesion of emulsions to the compositions it is necessary to have a coating weight of at least 2 g.s.m.

The compositions of the present invention may be applied to polyolefin coated paper by means, for example, of air doctor blade coaters or wire wound rod doctor systems, or for example by reverse roll and gravure methods. Satisfactoy coatings have been obtained at web speeds up to 500 feet per minute and it is believed that coating speeds substantially faster than this are possible.

The absorptive coatings produced by the method of the present invention, such as those produced from the specific formulations described above, provide good keying layers for subsequently applied aqueous layers, for example, photographic emulsions; products which comprise such subsequently-applied layers are included within the scope of the present invention.

The following examples illustrate specific methods of putting the present invention into effect.

EXAMPLE 1

In this example an intermediate for a diazo process was made by applying an absorptive coating to a tracing paper of substance 70 g.s.m. having a film of 0.5 mil polyethylene extruded on each side.

The coating used has the following formulation:

| | Ml. |
|---|---|
| 2½% solution of polyvinyl alcohol in water | 100 |
| 30% silica sol suspension | 40 |
| 5 N nitric acid | 2 |

The formulation was applied to one side of the polyethylene-coated tracing paper in a thickness of 8 g.s.m. by conventional coating apparatus and was dried to give a glossy absorptive coating layer.

When a light sensitive diazo solution was applied to the absorptive coating layer a product was obtained having a high density of absorbed diazo material and at the same time having an absorptive coating which adhered well to the polyethylene. The product further accepted pencil writing.

EXAMPLE 2

A diazo process intermediate was made in accordance with the method described in Example 1 with the exception that there was included in the formulation for the coating composition 30 ml. of calcium chloride solution of concentration 5 gm. ions Ca/litre and a gas developed diazo solution.

A satisfactory product was obtained with a matt finish which possessed good scratch and heat resistance and which permitted annotations to be made on it and to be erased.

EXAMPLE 3

This example describes a method of making a photographic product.

As a support a photographic half card was used having a face coating of 1 thou. pigmented polyethylene having a glossy finish and a reverse side coating of matt finished polyethylene, both applied by extrusion.

An absorptive coating of 2 to 5 g.s.m. was applied to the reverse side of the support comprising the formulation of Example 1 together with 30 ml. calcium chloride solution of concentration 5 gm. ion Ca/litre and 15 grams of unburst starch.

The face side of the support was spark discharge treated and then given a coating of a silver halide light sensitive emulsion.

An excellent improved photographic product with a paper-like feel was thus produced which permitted writing and back printing with aniline inks. Adhesives to permit a print to be mounted and stamps could be applied to the reverse side, the coating of which adhered strongly during photographic processing.

EXAMPLE 4

This example describes a method of making an improved sheet drafting material.

As a support was used a 70 g.s.m. tracing paper coated on both sides with a high density natural polyethylene, both coatings being 0.5 ml. in thickness with a glossy finish.

An absorptive coating of the formulation described in Example 1 and additionally including 30 ml. calcium chloride solution (concentration 5 gm. ions Ca/litre) and 3 gms. of silica pigment suspended in 10 ml. water, was applied to the support.

The matt absorptive coatings permitted ink application and pencil writing which could be erased and corrected. The dimensional stability was found to be improved over normal tracing paper and dyeline copies could be taken from the product by transmission exposure.

EXAMPLE 5

A diazo photographic paper was made as follows:

As a support was used a paper coated on the face side with a 0.5 mil thickness of pigmented polyethylene, glossy or matt finish, and on the reverse side with 0.5 mil natural polyethylene resin having a matt finish.

The absorptive coating used had the same formulation as that used in Example 3 and was applied in a coating weight of 2–8 g.s.m to the face side.

A semi-dry type of diazo solution was then applied to the absorptive coating. (Alternatively it could have been added to and applied with the absorptive coat.)

Good quality screened diazo prints were thus obtained having good adhesion and handling properties.

EXAMPLE 6

This example described a method of making a photographic support. As a support a photographic half card was used having a face coating of 1 thou. pigmented polyethylene having a glossy finish and a reverse side coating of matt finished polyethylene, both applied by extrusion.

An absorptive coating of 2–5 g.s.m. was applied to the reverse side of the support of the following formulation:

100 ml. ½% solution of carboxy methyl cellulose
40 ml. 30% silica sol suspension
30 ml. calcium chloride solution (5 grams ions calcium/litre)
3 gm. silica pigment
10 ml. water
2 ml. 5 N nitric acid
0.05% Triton 770

The face side of the support was spark discharge treated and then coated with silver halide emulsion.

An excellent product similar to that obtained in Example 3 was achieved.

EXAMPLE 7

This example decribes the preparation of a diazo intermediate.

Using a paper support as in Example 1 coatings of the following formulation were applied to each side in a density of 8 g.s.m.

20% polyvinyl alcohol (dry)
70% silica sol (dry)
10% silica pigment (dry)
Calcium chloride in specified ratio to sol
Nitric acid to pH 2.5

To one side was applied a semi-dry diazo light sensitive coating to produce improved print density.

No sensitive coating was applied to the reverse side but corrections in pencil or ink could be made to either side of the print.

EXAMPLE 8

Photo paper having a back writing coat was prepared as in Example 7 but using a coating composition of the formulation:

25 ml. 10% polyvinyl alcohol
25 ml. water
50 ml. methanol
40 ml. silica sol
10 ml. calcium chloride (13.6 gm./litre)
15 gm. rice starch
2 ml. 5 N nitric acid

EXAMPLE 9

A photographic paper was prepared as follows:

As a support was used a photographic half card coated on the face side with pigmented glossy polythene 1 mil in thickness and on the reverse side with 0.5 mil of natural matt polyethylene.

To the face side was applied a 2 g.s.m. coating of the formulation:

40 ml. silica sol (30% solids)
20 ml. polyvinyl alcohol (2½% solids)
pH adjusted to 4.5 with nitric acid On the reverse side was applied 5 g.s.m. of the coating formulation used in Example 3.

A silver halide light sensitive emulsion was then coated onto the face side.

The product showed excellent wet emulsion adhesion properties on processing and satisfactory printing and writing properties on the reverse side.

EXAMPLE 10

An extruded polypropylene-coated paper was further coated with the aqueous composition described in Example 4. The adhesion of this applied coating was found to be satisfactroy in all respects and the treated polyproylene surface possessed good writing and printing properties.

We claim:

1. A method of rendering absorptive to printing inks, diazonium salt solutions and other coatings applied from oleaginous, aqueous and organic solvent solutions and suspensions, and receptive to adhesives, photographic emulsions and other coatings applied from oleaginous, aqueous and organic solvent solutions and suspensions, an article having an extruded polyolefin coating, said method comprising the steps of:
   (a) applying to the surface of the oplyolefin coating an aqueous composition comprising at least about 5% of an aqueous silica sol, a non-polymeric acid, and at least about 5% of an acid-stable oragnic film-forming material which is soluble in water, said film-forming material being selected from the group consisting of polyvinyl alcohol and carboxymethyl cellulose, the pH of said aqueous composition being in the range of 2 to 5; and thereafter
   (b) drying and curing the said composition.

2. A method as claimed in claim 1 wherein the pH of the aqueous composition is in the range from 2 to 3.

3. A method as claimed in claim 2 wherein the acid contained in the aqueous composition is nitric acid, hydrochloric acid, acetic acid or citric acid.

4. A method of rendering absorptive to printing inks, dyes, and other coatings applied from oleaginous, aqueous and oganic solvent solutions and suspensions, a polyolefin-coated paper, said method comprising the steps of:
   (a) applying to the polyolefin-coated surface of the said paper an aqueous composition comprising at least about 5% of an aqueous silica sol, at least about 5% of a polyvinyl alcohol and a non-polymeric acid, the pH of said aqueous composition being in the range of 2 to 5, and thereafter
   (b) drying and curing the said composition.

5. A method as claimed in claim 4 wherein the ratio by weight of dry polyvinyl alcohol to dry silica sol is nearer to 1:19 than to 19:1.

6. A method as claimed in claim 5 wherein the ratio by weight of dry polyvinyl alcohol to dry silica sol is a minimum of 1:24.

7. A method of applying an absorptive coating having a matt surface to a polyolefin-coated paper, said method comprising the steps of:
(a) applying to the polyolefin-coated surface of the said paper a coating of an aqueous composition comprising at least about 5% of an aqueous silica sol, at least about 5% of an acid-stable organic film-forming material which is soluble in water, said film-forming material being selected from the group constituting of polyvinyl alcohol and carboxymethyl cellulose, a non-polymeric acid, and a wetting agent or a salt having a polyvalent metal cation; and thereafter
(b) drying and curing the said coating.

8. A method of applying an adsorptive coating having an abrasive surface to a polyolefin-coated paper, said method comprising the steps of:
(a) applying to the polyolefin surface of the said paper a coating of an aqueous composition comprising at least about 5% of an aqueous silica sol, at least about 5% of an acid-stable organic film-forming material which is soluble in water, said film-forming material being selected from the group consisting of polyvinyl alcohol and carboxymethyl cellulose, a non-polymeric acid, and a pigment material the pH of said aqueous composition being in the range of 2 to 5; and thereafter
(b) drying and curing the said coating.

9. A polyolefin-coated paper product comprising:
(a) a polyolefin-coated paper carrying bonded to the polyolefin surface;
(b) an absorptive composition comprising at least about 5% of silica particles, a non-polymeric acid, and at least about 5% of an acid-stable polymeric bonding material selected from the group consisting of polyvinyl alcohol and carboxymethyl cellulose, the pH of said composition being in the range of 2 to 5.

10. A photographic paper comprising:
(a) a polyolefin-coated paper product as claimed in claim 9, and
(b) a photographic emulsion coated on to the said absorptive composition.

11. A paper product suitable for use as an intermediate in a diazo printing process, said product comprising:
(a) a polyolefin-coated paper;
(b) bonded to the polyolefin surface of the said paper an absorptive composition comprising at least about 5% of silica particles, a non-polymeric acid, and at least about 5% of an acid-stable polymeric bonding material selected from the group consisting of polyvinyl alcohol and carboxymethyl cellulose, the pH of said composition being in the range of 2 to 5; and
(c) a photographic diazonium salt solution absorbed on the said composition.

12. The product according to claim 9 wherein said bonding material is polyvinyl alcohol in the amount of 20–60% dry, said silica particles are in the amount of 20–70% dry, and a pigment in the amount of 10–60% dry is added.

References Cited

UNITED STATES PATENTS

| | | | |
|---|---|---|---|
| 3,380,824 | 4/1968 | Bach | 96—75 |
| 2,805,159 | 9/1957 | Unkauf | 96—75 |
| 2,943,937 | 7/1960 | Wadean | 96—87 |
| 3,161,519 | 12/1964 | Alsup. | |
| 3,231,411 | 1/1966 | Tyler et al. | |

FOREIGN PATENTS 560,035  7/1958  Canada.

RONALD H. SMITH, Primary Examiner

U.S. Cl. X.R.

96—85, 87; 117—47, 76, 138.8, 155